C. LIPPE.
Picture-Frames.
No. 197,738. Patented Dec. 4, 1877.
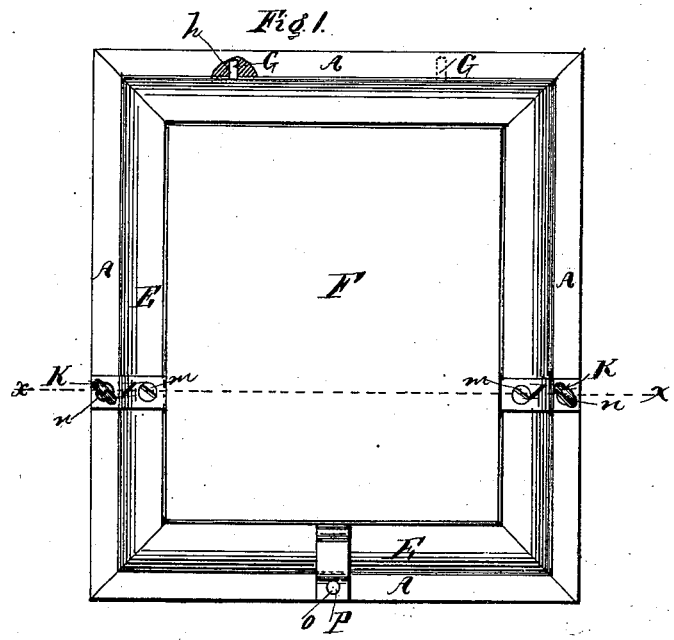
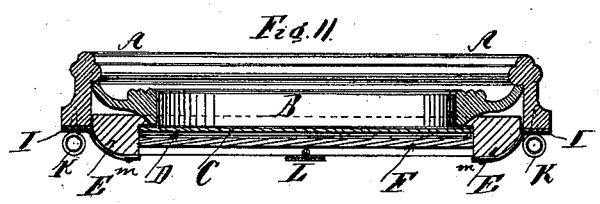
Witnesses:
J. Barrett
Edwin B. Jennings
Inventor:
Charles Lippe
Per.
Henry Gemer
Atty

UNITED STATES PATENT OFFICE.

CHARLES LIPPE, OF NEW YORK, N. Y.

IMPROVEMENT IN PICTURE-FRAMES.

Specification forming part of Letters Patent No. 197,738, dated December 4, 1877; application filed May 1, 1877.

*To all whom it may concern:*

Be it known that I, CHARLES LIPPE, of New York city, in the county of New York and State of New York, have invented new and useful Improvements in Picture-Frames; and I hereby declare that the following is a true and exact description of my invention, which will enable others skilled in the art to make and use the same, reference being had to the accompanying drawings, forming a part of this specification, and to the letters and figures of reference marked thereon.

My invention relates to placing and holding a picture in a picture-frame in such a manner that no injury is done to the frame in the operation, and thus the picture may easily be removed and replaced for the purpose of cleaning or repairing the frame.

Referring to the drawings, Figure I is a back view of a picture-frame embodying my invention. Fig. II is a sectional view through line $x\,x$, Fig. I.

A is the outer frame. B is the spandrel-frame. C is the glass. D is the picture. E is a back frame, in which the picture D is placed, and held therein by aid of the pasteboard or wooden board F. G G are pins placed in the outer edge of frame E, and are inserted in the holes $h\,h$. I I are two plates, bent to conform with both frames, and screwed at $m$ into the frame E. At $n$ are holes through which the eye-screws K K pass, which at the same time serve to hold frame E to frame A. They also serve as cord-fasteners. L is another plate or swivel, pivoted at $o$, by screw P, to the frame A, and serves also to hold the frame E to frame A.

By this arrangement the picture is placed in and removed from the frame A without inserting or withdrawing nails, which, when done even by experienced persons, is liable to injure the frame.

Having thus described my invention, I claim—

The plates I I and L, in combination with the frames E and A and eye-screws K K, substantially as described, and for the purpose set forth.

This specification signed this 16th day of April, 1877.

CHARLES LIPPE.

Witnesses:
 RICHD. GERNER,
 CHR. RIEGELMAN.